United States Patent [19]
Taylor

[11] Patent Number: 6,019,066
[45] Date of Patent: Feb. 1, 2000

[54] ANIMAL CONFINEMENT/TRAINING SYSTEM

[76] Inventor: Todd T. Taylor, 11466 E., 400 North, Kendallville, Ind. 46755

[21] Appl. No.: 09/039,831

[22] Filed: Mar. 16, 1998

[51] Int. Cl.⁷ ..................................................... A01K 15/00
[52] U.S. Cl. .......................... 119/720; 119/719; 119/908; 119/721
[58] Field of Search ................................. 119/719, 720, 119/721, 908; 340/573

[56] References Cited

U.S. PATENT DOCUMENTS

| | | |
|---|---|---|
| 3,589,337 | 6/1971 | Doss . |
| 3,935,443 | 1/1976 | Simmons ............................. 240/6.4 W |
| 4,335,682 | 6/1982 | Gonda et al. . |
| 4,802,482 | 2/1989 | Gonda et al. . |
| 4,947,795 | 8/1990 | Farkas . |
| 5,054,428 | 10/1991 | Farkus . |
| 5,067,441 | 11/1991 | Weinstein ................................ 119/721 |
| 5,207,178 | 5/1993 | McDade et al. . |
| 5,241,923 | 9/1993 | Janning .................... 119/721 |
| 5,408,956 | 4/1995 | Quigley ..................... 119/720 |
| 5,465,687 | 11/1995 | Custer ...................... 119/719 |
| 5,471,954 | 12/1995 | Gonda et al. ........................... 119/859 |
| 5,559,498 | 9/1996 | Westrick et al. ......................... 340/573 |
| 5,605,116 | 2/1997 | Kim et al. ................................. 119/720 |
| 5,636,597 | 6/1997 | Van Curen et al. ..................... 119/720 |
| 5,666,908 | 9/1997 | So ........................................... 119/720 |
| 5,815,077 | 9/1998 | Christiansen ............................ 340/573 |
| 5,844,489 | 12/1998 | Yarnall, Jr. et al. ..................... 119/721 |

*Primary Examiner*—Peter M. Poon
*Assistant Examiner*—Yvonne R. Abbott
*Attorney, Agent, or Firm*—Taylor & Associates, P.C.

[57] ABSTRACT

An animal confinement/training system controls the behavior of the animal through electrical stimulation to the skin of the animal. A stationary first transmitter transmits an airborne first encoded signal. A portable second transmitter transmits an air-borne second encoded signal. A receiver includes a receiver circuit coupled with a pair of electrodes. The receiver circuit is responsive to either of the first encoded signal or the second encoded signal for applying electrical stimulation to the skin of the animal with the pair of electrodes. The receiver further includes a temporary disabling device for temporarily disabling the responsiveness of the receiver circuit to the first encoded signal. The receiver circuit may also be responsive to another encoded signal from the second transmitter for actuating an illuminating light and/or audible alarm without applying electrical stimulation to the skin of the animal.

14 Claims, 3 Drawing Sheets

Fig. 1
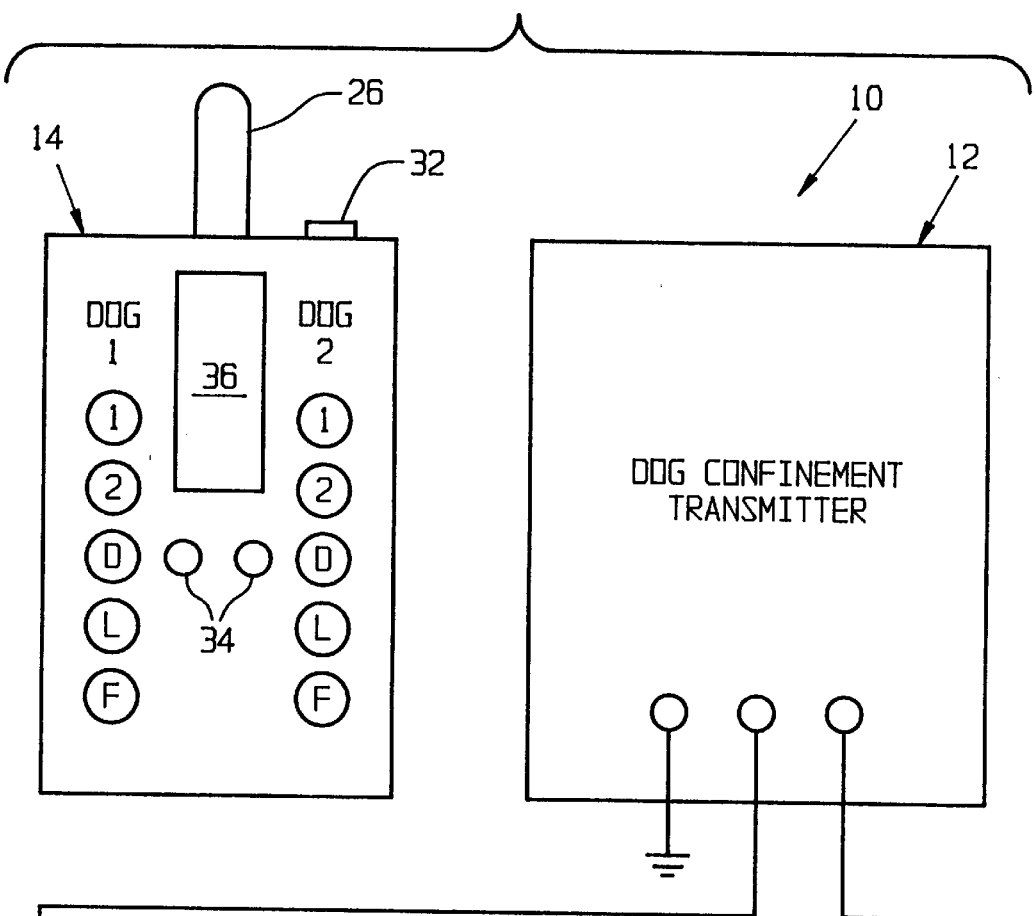
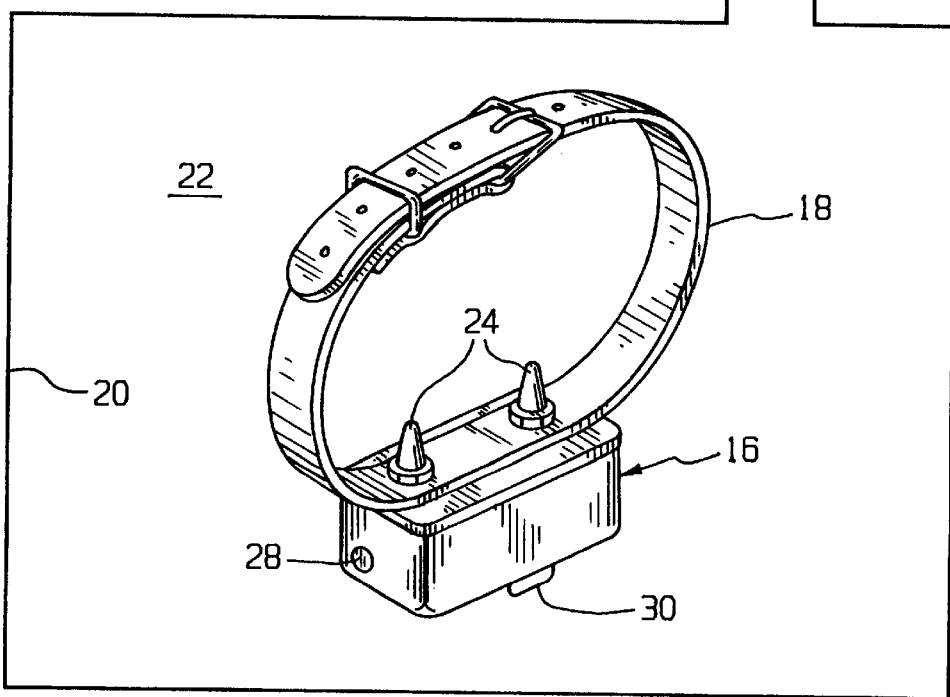

ANIMAL CONFINEMENT/TRAINING SYSTEM

BACKGROUND OF THE INVENTION

1. Field of the invention

The present invention relates to a system for controlling the behavior of an animal through the application of electrical stimulation to the skin of the animal.

2. Description of the related art

Animals such as dogs may be fitted with a collar which carries a receiver for applying electrical stimulation to the skin of the dog to control the behavior of the dog. For example, a conventional pet containment system includes a stationary transmitter which is connected to an endless wire placed around the confinement area under the surface of the ground. The stationary transmitter transmits a radio frequency (RF) signal over the endless wire. If the dog approaches too close to the wire, the receiver receives the RF signal and applies electrical stimulation to the skin of the dog. Alternatively, the stationary transmitter may transmit an RF signal which is received by the receiver. If the dog strays from the confinement area, the RF signal is no long received and electrical stimulation is applied to the dog.

A conventional dog training system may include a portable transmitter which is carried by the trainer. The portable transmitter selectively transmits an RF signal to the receiver for electrical stimulation when the animal exhibits undesirable behavior. Different levels of electrical stimulation may be applied to the dog by depressing corresponding buttons on the transmitter. Each button is associated with an encoded signal which is transmitted to the receiver. The receiver receives the encoded signal and applies electrical stimulation of a corresponding intensity to the skin of the dog. The intensity may be controlled by changing the voltage level, current frequency and/or pulse width of applied current pulse.

A problem with conventional confinement systems and training systems is that the respective receivers include dedicated circuitry which is not interchangeable. A portable transmitter associated with a training system cannot be used with a receiver associated with a confinement system. Thus, when a trainer desires to train the dog within the confinement area, a second receiver must be placed on the dog which is responsive to the portable training transmitter. Conversely, when a trainer desires to train or merely exercise the dog outside the confinement area, the receiver associated with the confinement system must be removed and the receiver associated with the training system placed on the dog. Failure to remove the receiver associated with the confinement system will result in the dog being unnecessarily shocked when crossing the boundary of the confinement area. To avoid this hazard, it is necessary to first remove the receiver associated with the confinement system while the dog is in the confinement area, then place the receiver associated with the training system on the dog, and then lead the dog from the confinement area. Since the dog is unable to determine which receiver it is wearing, the dog must still be lead away from the confinement area; however, the dog quickly learns that it is safe to exit the confinement area when being lead by the trainer.

While training a dog, it is sometimes impossible to determine the exact location of the dog, particularly in the case of hunting dogs working in thick vegetative cover or traveling over a long distance (such as when tracking certain animals). Known locating systems include a dedicated transmitter worn by the dog which transmits an RF signal to a portable receiver carried by the trainer. The portable transmitter provides a relative indication of both distance and direction of the dog, dependent upon the strength and direction of the received signal.

Even if the general location of a dog is known or it is possible to hear a dog moving around in cover, it may not be possible to tell exactly which dog is in what location if more than one dog is being trained. Knowing the exact location of each dog is important if one of the dogs is apparently injured or exhibiting incorrect behavior and it is necessary to apply correction through electrical stimulation to that dog without unnecessarily correcting another dog.

What is needed in the art is an animal confinement/training system which is compact, avoids unnecessary electrical stimulation of the dog, and allows the exact location of each separate dog to be quickly determined.

SUMMARY OF THE INVENTION

The present invention provides an animal confinement/training system which allows a single collar and receiver to be worn by the animal and disables the application of electrical stimulation caused by the stationary animal confinement transmitter so that the animal may be safely removed from the confinement area without removing the collar. The receiver is also provided with an illuminating light and audible alarm which are actuated with a portable animal training transmitter. The light and audible alarm are operable to identify a particular animal and in a manner which is responsive to ambient light.

The invention comprises, in one form thereof, an animal confinement/training system for controlling the behavior of the animal through electrical stimulation to the skin of the animal. A stationary first transmitter transmits an air-borne first encoded signal. A portable second transmitter transmits an airborne second encoded signal. A receiver includes a receiver circuit coupled with a pair of electrodes. The receiver circuit is responsive to either of the first encoded signal or the second encoded signal for applying electrical stimulation to the skin of the animal with the pair of electrodes. The receiver further includes a temporary disabling device for temporarily disabling the responsiveness of the receiver circuit to the first encoded signal. The receiver circuit may also be responsive to another encoded signal from the second transmitter for actuating an illuminating light and/or audible alarm without applying electrical stimulation to the skin of the animal.

An advantage of the present invention is that an animal confinement system and animal training system are combined into a single confinement/training system which allows the user to train the animal within the confinement area or remove the dog from the confinement area without removing or changing collars and without inadvertently shocking the animal.

Another advantage is that the receiver is provided with both an illuminating light and audible alarm which may each be selectively programmed for a mode of operation which identifies a particular animal and is responsive to ambient light.

Yet another advantage is that the receiver includes locator transmitter circuitry which is selectively enabled only when needed, thereby conserving power requirements and battery life.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a schematic view of an embodiment of an animal confinement/training system of the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
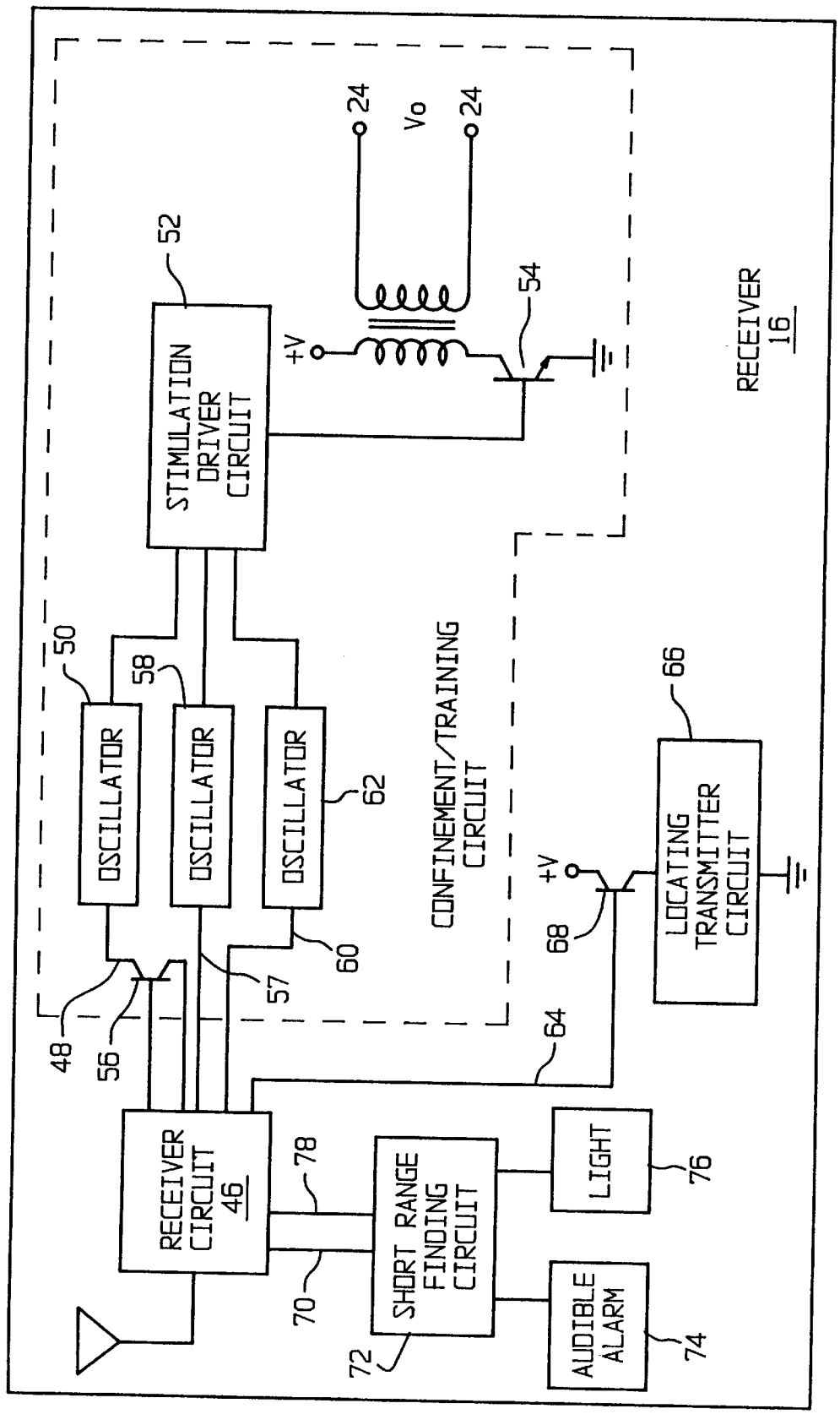
FIG. 2 is a schematic view of an embodiment of a receiver of the present invention.

Referring now to the drawings, and more particularly to FIG. 1, there is shown a schematic view of an embodiment of a system 10 for controlling the behavior of an animal through electrical stimulation to the skin of the animal. System 10 generally includes a stationary animal confinement transmitter 12, a portable animal training transmitter 14 and a receiver 16 mounted to a collar 18.

Unless otherwise noted, details familiar to persons skilled in the electronic arts will be omitted since they are extraneous detail and thus have no bearing on reducing the invention to practice. It is also to be understood, and it will be appreciated by those skilled in the art, that the methodology and logic of the present invention described herein may be carried out using any number of structural configurations such as electronic hardware, software, and/or firmware, or the like.

Stationary confinement transmitter 12 generally operates in a known manner to transmit a signal, such as an RF signal, through a continuous wire 20 which is buried slightly under the ground surface around a confinement area 22. If the dog wearing receiver 16 approaches too close to wire 20, electrical stimulation is applied to the skin of the dog through electrodes 24. The characteristics of the signal carried by wire 20, e.g., amplitude, may be selectively varied on confinement transmitter 12 to correspondingly vary the distance which the dog may approach wire 20 before electrical stimulation is applied. Examples of stationary confinement transmitters are manufactured and sold by Underground Fence systems, Inc., Radio Fence Systems, Inc. and Innotek, Inc. Stationary confinement transmitter 12 principally varies from conventional confinement transmitters in that the signal transmitted over wire 20, such as an RF signal, is complementary to other signals transmitted from portable training transmitter 14, as will be described in further detail hereinafter.

Portable animal training transmitter 14 is a hand held device allowing selective control of receiver 16. Training transmitter 14 includes two rows of buttons which may be depressed by a user to close corresponding switches within training transmitter 14. In the embodiment shown, the left hand row of buttons provides control over receiver 16 worn by a first dog, and a right hand row of buttons provides control over a substantially identical receiver (not shown) worn by a second dog. Each button and corresponding switch within the two rows effects the transmission of a corresponding encoded signal from antenna 26. Buttons 1 and 2 cause the transmission of respective encoded signals which effect the application of electrical stimulation of a corresponding intensity to the skin of the respective animal. The buttons D effect the transmission of respective encoded signals which disable the responsiveness of the corresponding receiver to the signal transmitted over wire 20 within confinement area 22. The buttons L effect the transmission of an encoded signal which energizes or otherwise enables a locating transmitter circuit within the receiver worn by the corresponding dog. The buttons F effect the transmission of an encoded signal which effects the operation of a beeper 28 and/or light 30 to allow the animal to be easily located and identified at close ranges. A sensor 32 which is responsive to ambient light, such as a photodiode or photo cell, provides a signal which is used in conjunction with signals from buttons F to operate beeper 28 and/or light 30 dependent in part upon the amount of ambient light. Indicator lights 34, such as LED's, provide a visual indication to the trainer that a receiver worn by a respective dog has been disabled from responding to a signal carried over wire 20 within confinement area 22. Of course, it will be appreciated by those skilled in the art that indicator lights 34 and/or sensor 32 may just as easily be incorporated into the circuitry of receiver 16. However, indicator lights 34 and sensor 32 are incorporated into portable training transmitter 14 to prevent physical damage thereto and provide convenience to the trainer. Additionally, sensor 32 is disposed on an end of training transmitter 14 so that the hand of the trainer is less likely to cover sensor 32 and provide a faulty indication of low ambient light. A display 36 forms part of a locator circuit within training transmitter 14 which may be of conventional design. Display 36 may be in any convenient form, such as a meter with a movable needle, LED's or a liquid crystal display.

Figure 3:
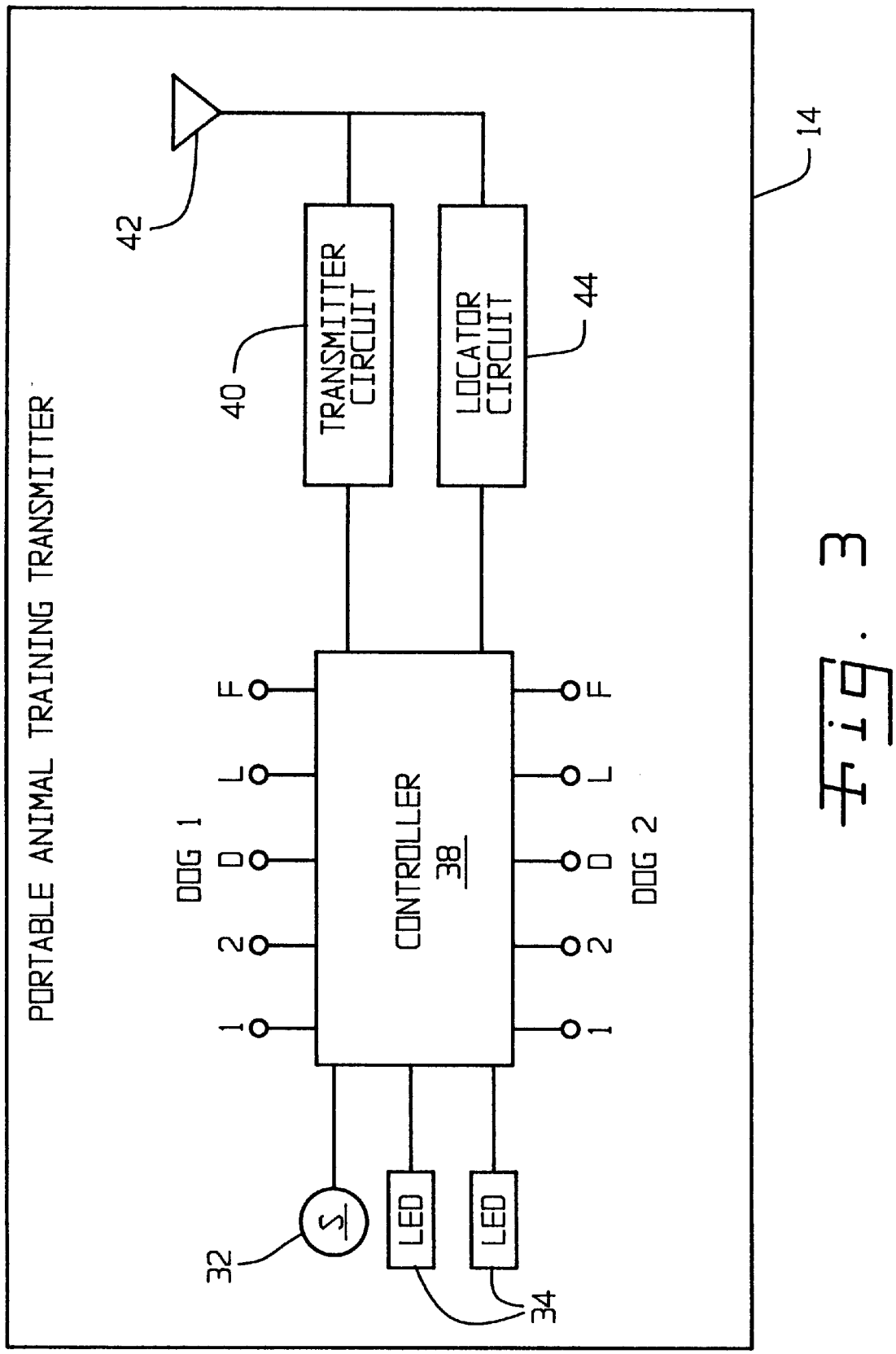
FIG. 3 is schematic view of an embodiment of a portable animal training transmitter of the present invention.

Training transmitter 14 is shown in greater detail in FIG. 3. Transmitter 14 includes a controller which may be of any convenient form, such as a software controlled microprocessor, application specific integrated circuitry (ASIC), or hard wired.

Controller 38 receives input signals from light sensor 32 and each of the two sets of buttons 1, 2, D, L and F. Depending upon which button is depressed, a transmitter circuit 40 transmits a corresponding encoded signal from antenna 42. If a button F is depressed, the encoded signal also depends upon whether or not an input is present from light sensor 32, such as through a logical AND operation. When one of buttons L is depressed, a corresponding encoded signal is transmitted to a receiver 16 o which enables a locating transmitter circuit 66 within the receiver. A locator circuit 44 receives the locating signals transmitted from receiver 16 allowing the dog to be located over a relatively long range. Locator circuit can preferably be disabled when not in use, and enabled upon depressing of a button L, thereby conserving power requirements. Additionally, transmitter circuit 40 can be disabled upon enabling of locator circuit 44 after locator circuit 44 receives a locating signal from receiver 16. Buttons L can thus in essence be used as toggles to enable and disable locator circuit 44 and transmitter circuit 40.

Referring now to FIG. 2, there is shown a schematic view of an embodiment of the electrical circuitry of receiver 16. A receiver circuit 46 receives an encoded signal from either of stationary confinement transmitter 12 or portable training transmitter 14 and provides a plurality of output signals, as will be described. If the encoded signal corresponds to a signal received from stationary confinement transmitter 12, a control signal is provided over line 48 to an oscillator 50 which causes a stimulation driver circuit 52 to close a transistor 54 and apply an electrical stimulation of a corresponding intensity to the skin of a dog across electrodes 24. For example, oscillator 50 and stimulation driver circuit 52 may effect the application of an open circuit electrical stimulation with a voltage $V_O$ of approximately 5000 volts at a frequency of approximately 200 Hz. For further details of oscillator 50 and stimulation driver circuit 52, reference is hereby made to U.S. Pat. No. 4,802,482 (Gonda, et al.).

A switch such as a transistor 56 is coupled with each of line 48 and receiver circuit 46. Switch 56 is normally maintained in a closed position such that electrical stimulation is applied when the dog approaches too close to wire 20. However, upon depressing of a button D, switch 56 is opened to disable the input control signal to oscillator 50, thereby disabling the responsiveness of receiver 16 to an encoded signal provided by stationary confinement transmitter 12. Thus, the dog may be lead or called out of confinement area 22 without receiving electrical simulation. Button D may merely act as a toggle to open or close switch 56, or may be used in conjunction with a timer circuit to open switch 56 for a specified period of time.

An encoded signal corresponding to depressing a button 1 results in the output of a control signal over a line 57 to oscillator 58 resulting in selective application of electrical stimulation to the dog. For example, the control signal transmitted over line 57 may result in electrical stimulation with an open circuit voltage of approximately 5000 volts and 50 Hz. Similarly, an encoded signal corresponding to depressing a button 2 on transmitter 14 results in the transmission of a control signal over line 60 to an oscillator 62 resulting in the application of electrical stimulation of a higher intensity. For example, transmitting a control signal over line 60 may result in electrical stimulation with an open voltage of approximately 5000 volts at a frequency of approximately 250 Hz.

If the encoded signal corresponds to depressing of a button L, receiver circuit 46 transmits a control signal over line 64 to enable locating transmitter circuit 66. Locating transmitter circuit 66 may itself be of conventional design. However, transmitting circuit 66 is selectively energized to only use electrical power when needed. More particularly, the trainer typically knows the whereabouts of each dog a majority of the time. Thus, there is no need to constantly energize locating transmitter circuit 66 except when occasionally needed, thereby conserving power requirements and prolonging battery life. If the dog does become lost, the trainer may transmit an encoded signal which effects a control signal over line 64 to close a switch 68, such as a transistor or field effect transistor.

If the encoded signal received by receiver circuit 46 corresponds to depressing a button F, and light sensor 32 detects a presence of ambient light above a threshold value (such as a level at which a photodiode reacts to a presence of light), then receiver circuit 46 provides a control signal over line 70 to a short range finding circuit 72. Short range finding circuit 72 then actuates an audible alarm 28. Short range finding circuit 72 may operate audible alarm 28 either in a continuous mode of operation or as a beeper. For example, if the left hand button F corresponding to dog 1 on transmitter 14 is depressed, audible alarm 28 may be operated continuously; and if the right hand button F corresponding to dog 2 is depressed, audible alarm 28 may be operated as a beeper.

If the encoded signal received by receiver circuit 46 corresponds to depressing a respective button F, and light sensor 32 detects an absence of ambient light which is below a threshold value, then receiver circuit 46 provides a control signal over line 78 to short range finding circuit 72 resulting in actuation of both audible alarm 28 and light 30. Since light 30 is probably not visible to the trainer during daylight hours, and therefore needlessly would increase the power requirements and decrease battery life, light 30 is only actuated when sensor 32 detects an absence of ambient light.

In the embodiment shown, light 30 is an LED which is mounted on the exterior of receiver 16 with a sufficient brightness to allow the dog to be seen from several yards, e.g., at least 30 yards. Preferably, light 30 is a two-color LED which may be selectively actuated to identify a particular dog. In this manner, a single LED, such as a red/green LED may be installed in identical receivers worn by two dogs. Upon synchronizing of each receiver 16 with control buttons for each dog on transmitter 14 in a known manner, depressing of a button F for dog 1 may result in the LED 30 being operated as a red LED on one receiver; and depressing a button F for dog 2 may result in the LED 30 being operated as a green LED on the other dog. In this manner, the required part count and inventory for receiver 16 may be reduced, with resultant decreases in manufacturing costs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal confinement/training system for controlling the behavior of the animal through electrical stimulation to the skin of the animal, said animal confinement/training system comprising:

a stationary first transmitter for transmitting a first encoded signal;

a portable second transmitter for transmitting an air-borne second encoded signal, said second transmitter comprising an animal training transmitter for selectively applying the electrical stimulation to the skin of the animal during training and configured for transmitting an air-borne third encoded signal; and a receiver including a receiver circuit coupled with a pair of electrodes, said receiver circuit being responsive to either of said first encoded signal and said second encoded signal for applying electrical stimulation to the skin of the animal with said pair of electrodes, said receiver further including a temporary disabling device for temporarily disabling said responsiveness of said receiver circuit to said first encoded signal, said receiver circuit being responsive to any of said first encoded signal, said second encoded signal and said third encoded signal for applying electrical stimulation of a corresponding intensity to the skin of the animal with said pair of electrodes.

2. The animal confinement/training system of claim 1, wherein said second transmitter is configured for transmitting an air-borne fourth encoded signal, and wherein said receiver includes a short range finding device and is responsive to said fourth encoded signal to selectively actuate said short range finding device.

3. The animal confinement/training system of claim 2, wherein said short range finding device comprises at least one of an illuminating light and an audible alarm.

4. The animal confinement/training system of claim 3, wherein said short range finding device comprises an illuminating light and an audible alarm, and wherein said second transmitter includes an ambient light sensor and is configured for transmitting an air-borne fifth encoded signal, said fourth encoded signal corresponding to ambient light above a threshold level and said fifth encoded signal corresponding to ambient light below said threshold level, said receiver being responsive to said fourth encoded signal to actuate only said audible alarm and said receiver being responsive to said fifth encoded signal to actuate each of said illuminating light and said audible alarm.

5. The animal confinement/training system of claim 3, wherein said illuminating light and said audible alarm are operable in at least two different modes of operation, said fourth encoded signal corresponding to at least one of said modes of operation.

6. The animal confinement/training system of claim 5, wherein said illuminating light is operable in one of a continuous and flashing manner and said audible alarm is operable in one of a continuous and beeping manner.

7. The animal confinement/training system of claim 6, wherein said illuminating light is operable in one of two different colors.

8. The animal confinement/training system of claim 1, wherein said temporary disabling device comprises a transistor connected to an output of said receiver circuit.

9. An animal confinement/training system for controlling the behavior of the animal through electrical stimulation to the skin of the animal, said animal confinement/training system comprising:

a stationary first transmitter for transmitting a first encoded signal;

a portable second transmitter for transmitting an air-borne second encoded signal; and a receiver including a receiver circuit coupled with a pair of electrodes, said receiver circuit being responsive to either of said first encoded signal and said second encoded signal for applying electrical stimulation to the skin of the animal with said pair of electrodes, said receiver further including a temporary disabling device for temporarily disabling said responsiveness of said receiver circuit to said first encoded signal, said receiver further including a locating transmitter circuit coupled with said receiver circuit, and wherein said second transmitter is configured for transmitting an air-borne sixth encoded signal, said receiver circuit being responsive to said sixth encoded signal to enable said locator transmitter circuit.

10. An animal confinement/training system for controlling the behavior of the animal through electrical stimulation to the skin of the animal, said animal confinement/training system comprising:

a portable transmitter for transmitting a plurality of air-borne encoded signals, said portable transmitter including an ambient light sensor, said portable transmitter comprising an animal training transmitter for selectively applying the electrical stimulation to the skin of the animal during training; and a receiver including a receiver circuit coupled with a pair of electrodes, said receiver further including an illuminating light and an audible alarm, said receiver circuit being responsive to one of said encoded signals for applying electrical stimulation to the skin of the animal with said pair of electrodes, said receiver being responsive to an other encoded signal to actuate only said audible alarm, and said receiver being responsive to a further encoded signal to actuate each of said illuminating light and said audible alarm, said other encoded signal corresponding to ambient light above a threshold level and said further encoded signal corresponding to ambient light below said threshold level.

11. The animal training system of claim 10, wherein said illuminating light and said audible alarm are operable in at least two different modes of operation, said other encoded signal corresponding to at least one of said modes of operation.

12. The animal training system of claim 11, wherein said illuminating light is operable in one of a continuous and flashing manner and said audible alarm is operable in one of a continuous and beeping manner.

13. The animal training system of claim 12, wherein said illuminating light is operable in one of two different colors.

14. An animal confinement/training system for controlling the behavior of the animal through electrical stimulation to the skin of the animal, said animal confinement/training system comprising:

a portable transmitter for transmitting a plurality of air-borne encoded signals; and a receiver including a receiver circuit coupled with a pair of electrodes, said receiver further including at least one of an illuminating light and an audible alarm, said receiver circuit being responsive to one of said encoded signals for applying electrical stimulation to the skin of the animal with said pair of electrodes, said receiver circuit being responsive to an other of said encoded signals for actuating at least one of said illuminating light and said audible alarm without applying electrical stimulation to the skin of the animal, said receiver further including a locating transmitter circuit coupled with said receiver circuit, said receiver circuit being responsive to an additional encoded signal to enable said locator transmitter circuit.

* * * * *